Aug. 31, 1943.   A. F. GREINER   2,328,139

UNIVERSAL JOINT

Filed Feb. 3, 1941   3 Sheets-Sheet 1

INVENTOR.
ANTON F. GREINER
BY Whittemore Hulbert Belknap
ATTORNEYS

Aug. 31, 1943.          A. F. GREINER          2,328,139
                        UNIVERSAL JOINT
              Filed Feb. 3, 1941          3 Sheets-Sheet 2

*INVENTOR.*
ANTON F. GREINER
BY
Whittemore Hulbert & Belknap
*ATTORNEYS*

Aug. 31, 1943.   A. F. GREINER   2,328,139
UNIVERSAL JOINT
Filed Feb. 3, 1941   3 Sheets-Sheet 3
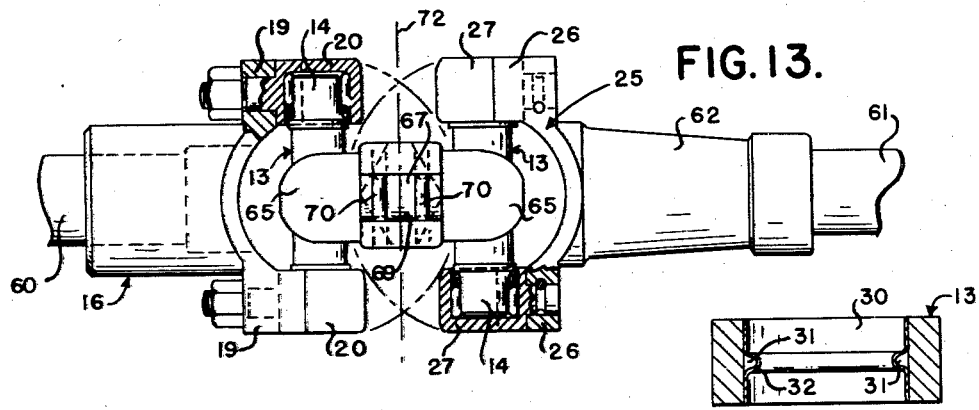
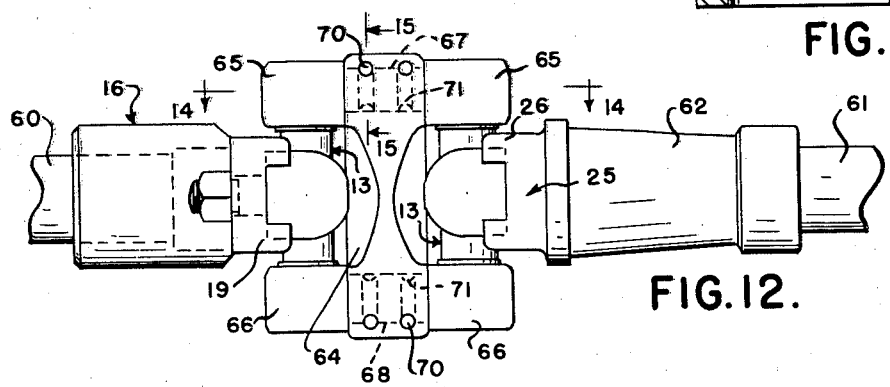
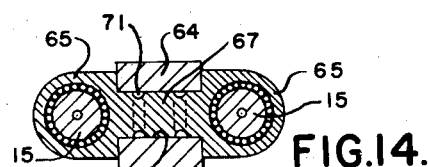
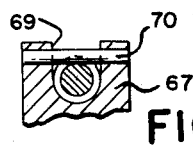
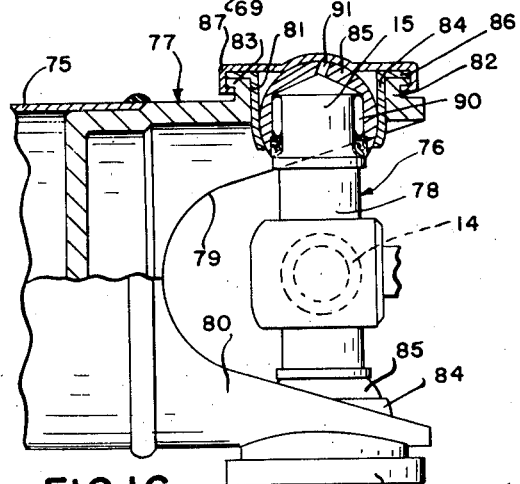
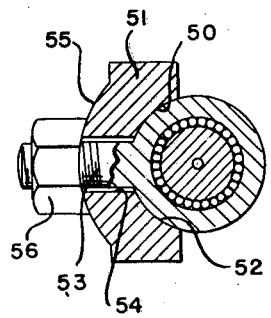
INVENTOR.
ANTON F. GREINER
BY Whittemore Hulbert Belknap
ATTORNEYS Patented Aug. 31, 1943

2,328,139

UNITED STATES PATENT OFFICE 2,328,139

UNIVERSAL JOINT

Anton F. Greiner, Detroit, Mich.

Application February 3, 1941, Serial No. 377,259

5 Claims. (Cl. 64—17)

This invention relates generally to torque transmitting mechanism and refers more particularly to improvements in torque transmitting universal joints.

One type of universal joint which has achieved considerable recognition in the trade for transmitting torque between relatively angularly movable driving and driven members comprises a yoke having two pairs of journals. The journals of one pair extend radially outwardly from diametrically opposite sides of the yoke and are respectively connected to the driving member through the medium of bearings. The other pair of journals extends radially outwardly from diametrically opposite sides of the yoke between the journals of the first pair and are respectively connected to the driven member through the medium of bearings carried by the latter. The bearings usually include needle roller bearings located between the journals and adjacent surfaces of the bearings.

In universal joints of the above type, both the bearings and the journals are rigidly fixed with respect to each other. As a result, the angle of deflection of the journals has a positive value under torque load, and the angle of deflection of the bearings is, of course, zero under all torque conditions. This difference between the angle of deflection of the journals and the angle of deflection of the bearings under torque load subjects the needle bearings to adverse force moments which tends to change the normal line contact of the rollers with the journals to a point contact. Accordingly, the needle bearing rollers dig into the hardened journals and produce indentations in the latter of such depth as to cause failure of the joint. As a matter of fact, many automobile accidents can be traced to failure of the universal joints and, therefore, it is important to eliminate the causes of such failures.

It is one of the principal objects of this invention to overcome the above objections by providing a torque transmitting device constructed in such a manner that torsional stresses and other adverse force moments are reduced to a minimum. According to this invention, the above is accomplished by providing a bearing and journal capable of relative movement under torque load in directions to permit one to follow the movements and deflections of the other regardless of the nature of the load conditions.

Another object of this invention is to provide a torque transmitting universal joint of the general type set forth above wherein the angle of deflection of the journals equals the angle of deflection of the bearings for the journals, irrespective of the nature of the torque load. As a result, a line contact of the needle bearing rollers with the journals is insured under all torque conditions, and the damaging indentations in the journals, previously referred to, are eliminated.

Still another object of this invention is to provide a dual torque transmitting universal joint permitting relative movement of the driving and driven members throughout a wide angle without binding or affecting the efficiency of the drive through the joint.

Another object of the present invention is to provide a torque transmitting universal joint embodying a lubricating system which insures uniform lubrication of all parts of the joint and thereby contributes materially in reducing the wear of the parts to a minimum.

A further feature of this invention is to provide a torque transmitting device composed of a relatively few simple parts capable of being readily assembled and connected to the driving and driven members.

The foregoing as well as other objects will be made more apparent as this description proceeds, especially when considered in connection with the accompanying drawings, wherein.

Figures 3, 4:
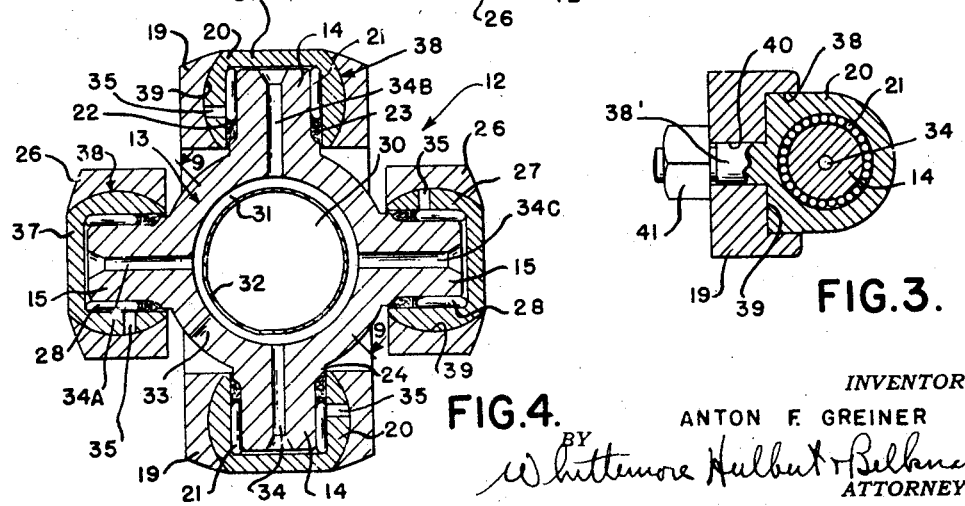
Figure 3 is a sectional view taken on the line 3—3 of Figure 1.
Figure 4 is a sectional view taken on the line 4—4 of Figure 1.
Figure 10:
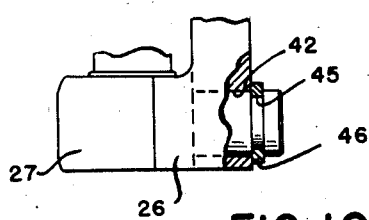

Figures 5 to 8, inclusive, are diagrams of a torque transmitting device;

Figure 9 is a sectional view taken on the line 9—9 of Figure 4;

Figure 10 is a fragmentary sectional view of a slightly modified form of the invention;

Figure 11 is a fragmentary sectional view illustrating a further modification of the present invention;

Figure 12 is a side elevational view of still another embodiment of this invention;

Figure 13 is a plan view of the construction shown in Figure 12;

Figure 14 is a sectional view taken on the line 14—14 of Figure 12;

Figure 15 is a sectional view taken on the line 15—15 of Figure 12, and

Figure 16 is a side elevational view partly in section of a further modification of this invention.

Although a number of the principles of the present invention may be advantageously used in connection with various different types of torque transmitting devices, nevertheless, the invention is particularly applicable when applied to torque transmitting universal joints and, accordingly, I have selected this embodiment of the invention for the purpose of illustration.

Figure 1:
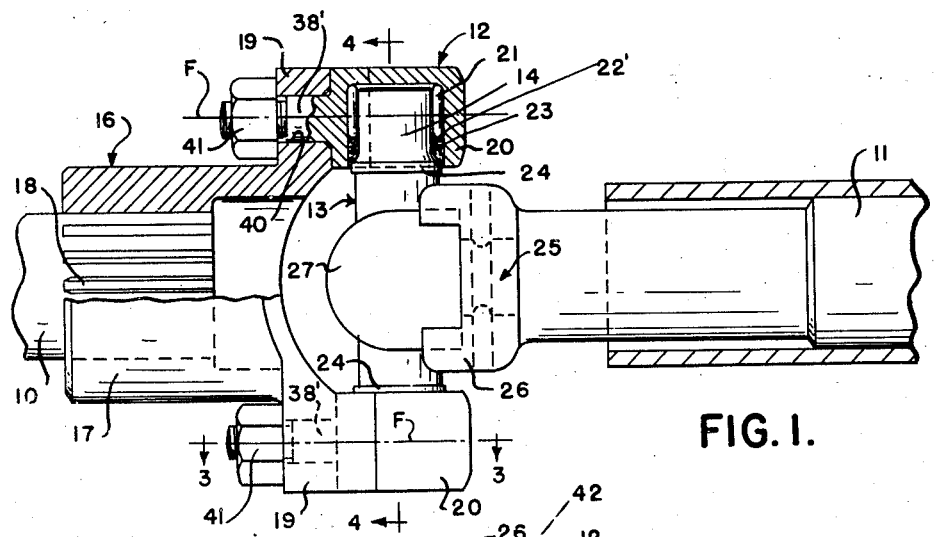
Figure 1 is a side elevational view partly in section of a torque transmitting device constructed in accordance with this invention.
Figure 2:
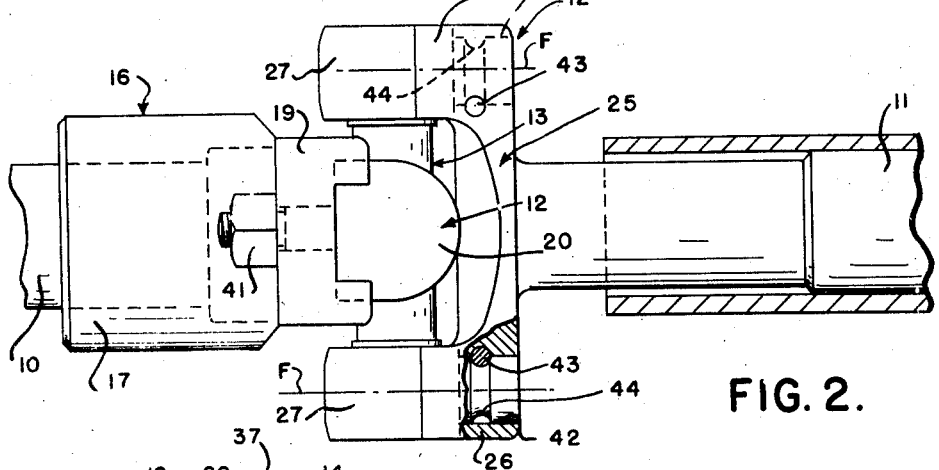
Figure 2 is a top plan view of the construction shown in Figure 1 having certain parts broken away for the sake of clearness.

In Figures 1 and 2 of the drawings, I have shown a drive shaft 10 and a driven shaft 11 operatively connected by means of a universal joint 12 constructed to effectively transfer the torque from the driving shaft 10 to the driven shaft 11 regardless of the angular positions of these shafts with respect to each other. In detail it will be noted that the universal joint 12 is provided with a yoke 13 having two pairs of journals 14 and 15 respectively. The journals 14 extend radially outwardly from diametrically opposite sides of the body portion of the yoke and have a common axis perpendicular to the axis of rotation of the yoke. The journals 15 extend radially outwardly from diametrically opposite sides of the body portion of the yoke between the journals 14 and have a common axis perpendicular to the axis of the journals 14.

In the present instance, the journals 14 are operatively connected to the driving shaft 10, and the journals 15 are operatively connected to the driven shaft 11 so that torque is transmitted from one shaft to the other through the yoke. Upon reference to Figure 1, it will be noted that the connection between the driving shaft 10 and the journals 14 on the yoke 13 includes a coupling 16 having a tubular hub portion 17 nonrotatably secured to the drive shaft 10 by means of splines 18, or other suitable fastening devices. One end of the coupling 16 extends beyond the adjacent end of the drive shaft 10 and is provided with diametrically opposed radially outwardly extending ears 19 on which bearings 20 are supported in a manner to be more fully hereinafter described. It will suffice to point out at this time that the bearings 20 are in the form of radially inwardly opening caps adapted to respectively receive the journals 14. In accordance with conventional practice, a plurality of needle bearing rollers 21 are supported around the journals 14 and the adjacent inner cylindrical surfaces of the bearing caps. The axis of each needle bearing roller is parallel to the common axis of the journals 14 so that the needle bearing rollers normally have a line contact with the cylindrical surfaces of the journals and bearings. In the present instance, the needle bearing rollers 21 are held in place by means of washers 22 respectively pressed into the open ends of the bearings and forming a backing for the packing rings 23 which are held in place by suitable shoulders 24 formed on the radially inner ends of the journals 14.

Upon reference to Figure 2, it will be noted that the end of the driven shaft adjacent the yoke 13 is provided with a head 25 having diametrically opposed ears 26 similar to the ears 19 previously described and adapted to support bearings 27 in a manner which will be more fully hereinafter set forth. The bearings 27 are also in the form of radially inwardly opening caps and respectively receive the journals 15. A plurality of needle bearing rollers 28 surround each journal 15 in the associated bearings 27 in exactly the same manner previously described, and the needle bearings 28 are held in place by means similar to the means described above for holding the needle bearings 21 in position. The above construction is such that torque is transmitted from one shaft to the other through bearings and journals carried by the yoke 13. It will also be noted that with the above construction, the shafts may assume different angular positions with respect to each other without interfering with the transmission of torque from one shaft to the other.

In order to insure proper lubrication of the several parts of the joint, it will be noted from Figure 4 that the body portion of the yoke 13 is formed with an axially extending bore 30 therethrough having a lining 32 in the form of a sheet metal annulus pressed into the bore. As shown in Figure 9, the annulus 32 is formed with an annular groove intermediate the ends thereof which cooperates with the adjacent surface of the bore 30 to form a closed oil groove 31. The annular groove 31 is supplied with lubricant through a port 33 formed in the body portion of the yoke and communicating with the annular groove 31. It will further be observed from Figure 4 that each journal is formed with a radially extending passage having the inner end communicating with the annular groove 31 and having the outer end communicating with the interior of the associated bearing with the result that lubricant is supplied to the needle bearing. It may be pointed out at this time that each of the bearings 20, 27 are formed with ports 35 therethrough for supplying lubricant to the exterior surfaces of the bearings, and the reason for lubricating these surfaces will be presently set forth.

In order to insure delivery of substantially the same amount of lubricant to each of the needle bearings, the passages 34 and 34$^a$ through the journals 14, 15 (respectively) at opposite sides of the lubricant supply port 33 are of smaller cross sectional area than the passages 34$^b$ and 34$^c$ through the journals remote from the port 33. Also, the quarter section of the oil groove extending between the inner ends of the passages 34 and 34$^a$ is of smaller cross sectional area than the cross sectional area of the remainder of the groove 31. The construction is such as to afford a greater resistance to the flow of lubricant to the journals immediately adjacent the lubricant supply port 33 than is afforded to the flow of lubricant to the journals remote from the port 33. The relative sizes of the different portions of the lubricant passages being determined in dependence upon the consistency of the lubricant used. As a result, each bearing is insured of its share of the lubricant regardless of the position of the bearing relative to the lubricant supply port 33.

Figure 5:
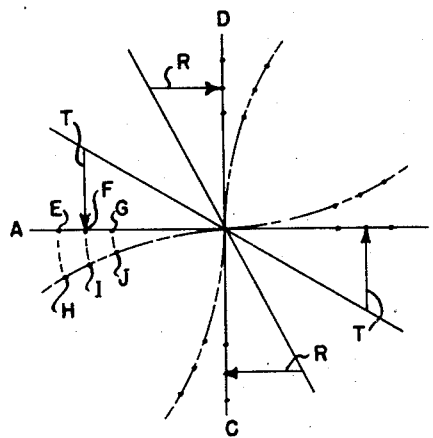

In Figure 5 of the drawings, I have illustrated a diagram of a "cross" representing the yoke 13. The arms A, B, C, and D on the cross represent the four journals previously referred to as extending radially outwardly from the yoke. The line T in the diagram indicates the driving torque, and the line R indicates the torque reaction. The dotted lines shown in the diagram represent the deflection of the arms caused by subjecting the yoke 13 to torque. In other words, when the yoke 13 is subjected to torque, the points E, F, and G on the arm A, for example, move to the positions H, I, and J respectively. The distance E, G represents the length of one journal, and the point F is the center point of the journal. It follows from the above that the point E of the journal moves through a greater distance than the point G when the journal is subjected to a torque load. It will, of course, be understood that the same remarks hold true with respect to the other three arms B, C, and D.

Figure 6:
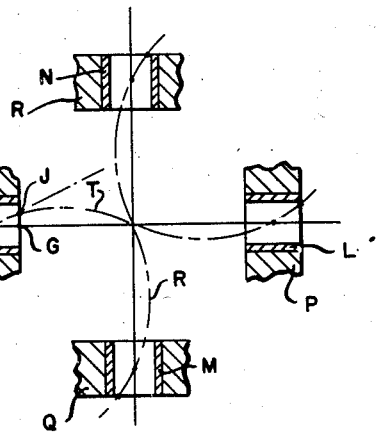
Figure 7:
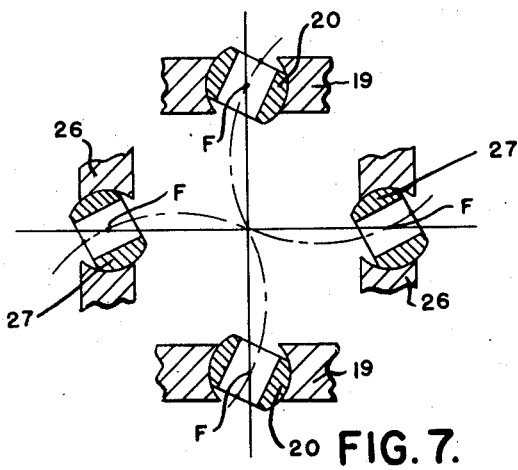

With the above in mind, reference will now be made to the diagram shown in Figure 6, differing from the illustration shown in Figure 5 in that the deflection of the journals on the yoke is constrained by bearings K, L, M, and N. In accordance with conventional practice, the bearings are, in turn, rigidly held in supports diagrammatically indicated by the reference characters O, P, Q, and R, respectively. Assuming now that the "cross" or yoke 13 is subjected to the driving torque T and torque reaction R, it will be noted that the arms of journals deflect in the manner indicated by the dotted lines in Figure 6. The difference in deflection of the arms shown in Figure 6 and the arms shown in Figure 5 is, of course, due to the fact that the arms, in Figure 6, are restrained by the rigid supports for the bearings. In detail, it will be noted that in Figure 6 the journal or arm A is compelled to deflect about the center point F which, of course, does not move. As a result, the point E on the arm A moves to the point H in one direction, and the point G on the arm A moves in an opposite direction to the point J.

Figure 8:
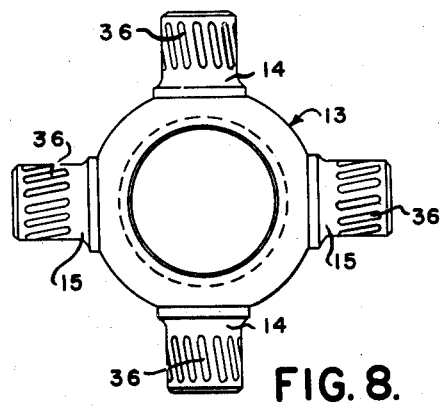

The above deflection of the arms or journals tends to cock the needle bearing rollers surrounding the journals to such an extent that these rollers have merely a point contact with the adjacent bearing surfaces instead of the desirable line contact which exists under normal circumstances when no torque is being transmitted. In other words, with the above construction, the deflection S of the bearings has a positive value as distinguished from the angle of deflection of the rigidly supported bearings for the journals which has a zero value. The result of the point contact of the needle bearing rollers with the journals is graphically indicated in Figure 8 of the drawings wherein the oblique indentations 36 on the journals represent the outlines of the needle bearing rollers which have been pressed into the hardened surface of the journals to such an extent that the latter are not fit for future use. The illustration in Figure 8 is the direct result of the deflection of the journals under torque load when the bearings for the journals are rigidly supported, and many accidents can be traced to the failure of the joint caused by this condition.

As pointed out above, it is one of the principal objects of this invention to support the bearings 20, 27 for the journals in such a manner that these bearings may adjust themselves under torque load relative to their respective supporting means to compensate for deflection of the journals. In other words, the bearings 20, 27 are movably mounted on their respective supports 19, 26 to, in effect, follow the deflection of the journals. Before describing the manner in which the journals are mounted on their respective supports, reference is made to Figure 7 which illustrates the action of the yoke under torque loads when the journals are supported in movable bearings. As diagrammatically shown in Figure 7, the bearings 20, 27 are rotatable relative to their fixed supports substantially about the axes F in dependence upon deflection of the journals. As a result, the bearings are free to adjust themselves under torque loads to the motions and deflections of their respective journals caused by the transfer of torque through the journals. It follows, therefore, that deflection of the needle bearing rollers relative to the journals is reduced to a minimum and that the desired line contact of the rollers with the journals is maintained regardless of the nature of the load conditions.

Upon reference to Figures 3 and 4, it will be noted that each bearing 20, 27 is in the form of an inwardly open cup-shaped member having a substantially flat outer wall 37 and having cylindrical opposed side walls 38 concentric with the axis F. In addition, each bearing has a stud, also, concentric with the axis F and projecting from the front wall of the bearing. Each of the ears 19, 26 is formed with a recess 39 for receiving one of the bearings, and the surfaces of the recess adjacent the cylindrical surfaces 38 of the bearing are concentric with the latter surfaces. The arrangement is such that the cylindrical surfaces 38 on the bearings 20, 27 cooperate with the cylindrical surfaces on the ears 19, 26 (respectively) to support the bearings for rotative movement about the axes F.

As stated above, the bearings 20 are secured to the ears 19 on the drive shaft coupling 16, and the bearings 27 are secured to the ears 26 on the head 25 of the driven shaft 11. This is accomplished by extending the studs 38' on the bearings 20 through openings 40 formed in the ears 19 in concentric relation to the axes F. In the present instance, the free ends of the studs 38' are threaded for engagement with a clamping nut 41. The studs on the bearings 27 are extended through openings 42 formed in the ears 26 on the head 25 of the driven shaft in concentric relation to the axes F. The studs 42 may be secured to the ears 26 in the same manner as the studs 38' or by pins 43 which extend transversely through the ears 26 and engage in grooves 44 formed in the studs 42. Another alternative is shown in Figure 10 wherein the free ends of the studs project beyond the ears and are provided with annular grooves 45 for receiving securing rings 46. Regardless of the nature of the fastening means provided for the bearings, the construction is such as to not only insure the transfer of torque through the bearings but, to also permit movement of the bearings relative to their respective supports under torque loads.

It is pointed out at this time that the cylindrical surfaces of the recesses 39 in the ear 19, 26 not only rotatably support the bearings but, also cooperate with the studs 38' to transfer torque from one shaft to the other. It may also be pointed out at this time that the cooperating engaging surfaces of the recesses 39 and bearings are lubricated by the escape of lubricant through the ports 35 previously described. In the event it is desired to eliminate the ports 35, the cooperating engaging surfaces may be coated with a relatively soft metal, such as copper zinc or lead so as to provide dry lubrication of the surfaces.

In addition to the foregoing, it will be noted that the studs 38 are formed integral with the bearings. As a result, the number of separate parts of the joint is reduced to a minimum which is advantageous not only because it reduces the cost of manufacture but, also, because it simplifies and reduces the time required for assembly.

In cases where the torque reaction is relatively great and substantial movement of the bearings relative to their supports is required to compensate for torque deflection of the journals, it is desirable to secure the bearings on their respective supports in such a manner that the bearings may have a universal movement relative to their supports. With this in mind, reference is made to Figure 11 wherein the support for one of the bearings is shown in detail, and it is to be understood that the supports for the other bearings are identical in construction. It may be pointed out that the recess 50 in the bearing supporting ear 51 corresponds to the recess 39 shown in Figure 3 except that the bearing surface of the recess 50 is spherical instead of cylindrical as in the first described form of the invention. The spherical surface of the recess 50 is concentric with the axis of the journal extending into the bearing and the outer surface 52 of the bearing is spherically shaped to have a bearing engagement with the spherical surface of the recess 50. In other words, the construction is such that the bearing engages the ear 51 in a manner to provide universal adjustment of the bearing relative to the ear.

It will also be noted from Figure 11 that the bearing is provided with a stud 53 which extends through an opening 54 in the ear 51 and projects beyond the surface 55 of the ear for threadedly receiving a clamping nut 56. The surface 55 of the ear is spherical and is concentric with the spherical surface 50. The adjacent side of the nut 56 is also spherical and is concentric with the spherical surface 55 with the result that the bearing has a limited universal movement relative to the ear 51. Of course, it will be understood that sufficient clearance is provided between the shank of the stud 53 and the side walls of the opening 54 to permit the desired range of adjustment of the bearing under torque load.

Referring now to the embodiment of the invention shown in Figures 12 to 15, inclusive, it will be noted that I have illustrated a dual torque transmitting joint. In these figures, the reference characters 60 and 61 respectively indicate driving and driven shafts having the adjacent ends spaced from each other. A coupling is splined on the driving shaft 60 and this coupling is identical in construction to the coupling 16 described in connection with the first embodiment of this invention. Accordingly, the same reference characters are used to indicate the corresponding parts of the two couplings.

A coupling 62 is splined on the driven shaft and this coupling is provided with a head portion identical in construction to the head portion 25 previously described. Consequently, the same reference characters are used to indicate corresponding parts of the heads. It may be pointed out, however, that the relationship between the ears 26 on the head 25 and the ears 19 on the coupling 16 differ from the relationship shown in Figures 1 and 2. Upon reference to Figures 12 and 13, it will be noted that the ears 19 on the coupling 16 and the ears 26 on the head 25 are disposed in substantial common plane instead of being arranged at right angles to each other as in the first described form of the invention. Positioned between the coupling 16 and the head 25 is a pair of yokes which need not be described in detail since they are identical in construction to the yoke 13 previously described. Accordingly, the same reference characters applied to the yoke 13 in the first described form of the invention are used to indicate corresponding parts of the two yokes shown in Figures 12 to 15, inclusive. It may be pointed out, however, that the pair of journals 14 on one yoke are connected to the ears 19 on the coupling 16 by bearings identical in construction to the bearings 20 previously described and that the journals 14 on the other yoke are connected to the ears 26 on the head 25 by bearings corresponding to the bearings 27 previously described. Inasmuch as the bearings are identical in construction to the bearings described in connection with the first embodiment of the invention, I have used the same reference characters to indicate corresponding parts thereof.

Positioned between the yokes is a torque transmitting element 64 having the opposite ends respectively connected to the journals 15 on the yokes 13. A pair of bearings 65 are supported at opposite sides of one end of the torque transmitting element 64 and respectively receive the journals 15 extending from one side of the yokes 13. A second pair of bearings 66 are supported at opposite sides of the other end of the torque transmitting element 64 and respectively receive the other journals 15 on the yokes. In detail, the pair of bearings 65 are integrally connected together by means of a shaft 67 and the pair of bearings 66 are integrally connected together by means of a shaft 68. The shafts 67 and 68 are respectively rockably mounted in opposite ends of the torque transmitting element 64 so as to permit limited rocking movement of the bearings to compensate for deflections of the journals 15 under torque load.

In the interest of simplicity of manufacture and assembly, the opposite ends of the torque transmitting element 64 are slotted as at 69. The slots open through the opposite ends of the element 64 and respectively receive the shafts 67 and 68. The shafts are held in assembled relationship with the respective slots by means of pins 70 extending transversely through the opposite ends of the element 64 beyond the shafts 67 and 68. It will be noted from Figure 12 that the shafts 67 and 68 are provided with annular grooves 71 for receiving the inner portions of the pins 70 in a manner to permit the limited rocking movement of the shafts and associated bearings required to compensate for torque reactions. It may be pointed out at this time that while the mountings for the various bearings shown in Figures 12 to 15, inclusive, are substantially the same as the mountings previously described in connection with the first embodiment of this invention, nevertheless, the bearing mountings shown in Figure 11 may be employed in the event it is desired to compensate for the relatively small torsional movement of the journals under torque load. This movement, however, is usually so small as compared to the deflection of the journals that it may be safely disregarded.

Thus, from the foregoing it will be noted that I have provided a dual universal joint wherein the construction of the joint at one side of the median plane indicated by the reference character 72 in Figure 13 is identical to the construction at the opposite side of this plane and this is advantageous in that it insures efficient operation of the joint regardless of the relative angular displacement of the driving and driven shafts. In addition, it will be noted that the dual joint is so constructed as to provide for a wide angle of deflection of the driving and driven shafts which, of course, is advantageous in many types of motor vehicles. In addition, the joint is compact and may be readily, inexpensively manufactured and assembled.

In Figure 16 of the drawings I have illustrated another construction embodying the general principles described in connection with the above modifications. In detail, the reference character 75 in Figure 16 indicates a tubular driven shaft operatively connected to a drive shaft (not shown) through the medium of a universal joint 76 and a cup-shaped stamping 77. The closed end of the stamping 77 is slightly reduced and is sleeved into the forward end of the driven shaft 75. The reduced portion of the cup-shaped stamping is welded or otherwise permanently secured to the driven shaft so as to rotate as a unit therewith.

The universal joint 76 comprises a yoke 78 identical in construction to the yoke 13 described in connection with the first embodiment of this invention. Accordingly, corresponding parts of the two yokes are indicated by the same reference characters. The journals 15 on the yoke are respectively connected to the stamping 77, and the journals 14 are respectively connected to the driving member which is not shown in Figure 16. In this connection, it will be noted that the diametrically opposite side walls of the stamping 77 are cut away to form openings 79 of sufficient size to provide clearance for the journals 14 and their associated bearings.

The openings 79 form diametrically opposed ears 80 at the forward end of the stamping 77, and the ears are fashioned with aligned openings 81 therethrough for respectively receiving the journals 15. A circular flange 82 extends radially outwardly from the ears at the marginal edges of the openings 81 and terminate in laterally extending annular flanges 83. A retainer sleeve 84 is pressed into each of the openings 81 and the radially inner end of the sleeve is shaped to retain a spherically contoured bearing 85. The radially outer end of each retainer sleeve 84 is provided with a laterally outwardly extending annular flange 86 adapted to be clamped against the annular flange 83 by means of a cap 87 having the peripheral edge crimped over the radially inner sides of the annular flanges 83. The central portion of the cap is spherically shaped to engage the bearing 85 and cooperates with the retainer to provide for limited universal adjustment of the bearing.

The bearings 85 are provided with cylindrical bores opening through the radially inner sides of the bearings and adapted to respectively receive the journals 15 on the yoke 13. In the present instance, needle bearing rollers 90 are supported between the cylindrical surfaces of the journals 15 and the adjacent surfaces of the bearings 85. These needle bearing rollers are retained in assembled relation with the bearings and are lubricated in the same manner defined in connection with the first embodiment of this invention. In this connection, it will be noted that each of the bearings has a port 91 through the radially outer side thereof for supplying lubricant to the spherically shaped surfaces of the caps 87.

The journals 14 of the yoke 13 shown in Figure 16 may be connected to the driving member (not shown) in the same manner as the journals 15. However, I have shown the journals 14 as adapted to be connected to the driving member (not shown) by bearings which are similar to the bearings previously described in connection with the first embodiment of this invention.

Referring again to Figure 16, it will be noted that the spherically shaped bearings 85 can follow the deflection of the journals 15 under any torque load conditions and as a result the angle of deflection of the bearings is at all times and under any load conditions substantially equal to the angle of deflection of the journals. Consequently, the objectionable point contact of the needle bearings with the journals is avoided and efficient operation of the universal joint over a long period of time is insured.

What I claim as my invention is:

1. In a torque transmitting universal joint, driving and driven members having the adjacent ends spaced from each other, a pair of yokes positioned between the adjacent ends of the members, a pair of journals extending radially outwardly from diametrically opposite sides of each yoke and having a common axis, a pair of bearings respectively connecting the journals on one yoke to the adjacent end of one of said members, a second pair of bearings respectively connecting the journals on the second yoke to the other of said members, a second pair of journals extending radially outwardly from diametrically opposite sides of each yoke and having a common axis perpendicular to the common axis of the first pair of journals, a torque transmitting element positioned between the yokes, bearings supported at opposite ends of the torque transmitting element for rocking movement relative to the latter and respectively connected to the second pair of journals on the first yoke, and additional bearings supported at opposite ends of the torque transmitting element for rocking movement and respectively connected to the second pair of journals on the second yoke.

2. In a torque transmitting universal joint, driving and driven members having the adjacent ends spaced from each other, a pair of yokes positioned between the adjacent ends of the members, a pair of journals extending radially outwardly from diametrically opposite sides of each yoke and having a common axis, a pair of bearings respectively connecting the journals on one yoke to the adjacent end of one of said members, a second pair of bearings respectively connecting the journals on the second yoke to the other of said members, a second pair of journals extending radially outwardly from diametrically opposite sides of each yoke and having a common axis perpendicular to the common axis of the first pair of journals, a torque transmitting element positioned between the yokes, a pair of bearings on opposite sides of the torque transmitting element at one end of the latter and connected together by a shaft rockably mounted in said end of the element, a second pair of bearings on opposite sides of the torque transmitting element at the opposite end of the latter and connected together by a shaft rockably mounted in said opposite end of the element, the bearings at opposite ends of the element on one side of the latter being respectively connected to the second pair of journals on the first yoke and the bearings at opposite ends of the element on the other side of the latter being respectively connected to the second pair of journals on said second yoke.

3. In a torque transmitting universal joint, a pair of yokes spaced from each other, a pair of journals extending radially outwardly from diametrically opposite sides of each yoke, a pair of bearings respectively engaging one journal of each pair and connected together by a shaft, a second pair of bearings respectively engaging the other journal of each pair and connected together by a shaft, and an intermediate torque transmitting element having the opposite ends connected to said shafts between the bearings and supporting the shafts for rocking movement.

4. In a torque transmitting universal joint, a pair of yokes spaced from each other, a pair of journals extending radially outwardly from diametrically opposite sides of each yoke, a pair of bearings respectively engaging one journal of each pair and connected together by a shaft, a second pair of bearings respectively engaging the other journal of each pair and connected together by a shaft, a torque transmitting element between the yokes having the opposite ends slotted to respectively receive the portions of the shafts between the bearings and support the shafts for rocking movement, and means for retaining the shafts in assembled relation with the slots in opposite ends of the torque transmitting element.

5. In a torque transmitting universal joint, driving and driven members having the adjacent ends spaced from each other, a pair of yokes positioned between the adjacent ends of the members, a pair of journals extending radially outwardly from diametrically opposite sides of each yoke and having a common axis, a pair of bearings supported on one of the members for rocking movement relative to the latter and respectively engaging the journals on one yoke, a second pair of bearings supported on the other member for rocking movement relative to the latter and respectively engaging the journals on the second yoke, a second pair of journals extending radially outwardly from diametrically opposite sides of each yoke and having a common axis perpendicular to the common axis of the first pair of journals, a torque transmitting element located between the yokes, bearings supported at opposite ends of the torque transmitting element for rocking movement relative to the latter and respectively connected to the second pair of journals on the first yoke, and additional bearings supported at opposite ends of the torque transmitting element for rocking movement relative to the latter and respectively connected to the second pair of journals on the second yoke.

ANTON F. GREINER.